(12) United States Patent
Dekarz

(10) Patent No.: US 11,941,828 B2
(45) Date of Patent: Mar. 26, 2024

(54) FEATURE POINT DETECTION APPARATUS AND METHOD FOR DETECTING FEATURE POINTS IN IMAGE DATA

(71) Applicant: BASLER AG, Ahrensburg (DE)

(72) Inventor: Jens Dekarz, Bad Oldesloe (DE)

(73) Assignee: BASLER AG, Ahrensburg (DE)

(*) Notice: Subject to any disclaimer, the term of this patent is extended or adjusted under 35 U.S.C. 154(b) by 477 days.

(21) Appl. No.: 17/171,401

(22) Filed: Feb. 9, 2021

(65) Prior Publication Data

US 2021/0248777 A1     Aug. 12, 2021

(51) Int. Cl.
| | | |
|---|---|---|
| *G06T 7/40* | (2017.01) | |
| *G01S 17/42* | (2006.01) | |
| *G01S 17/894* | (2020.01) | |
| *G06T 7/246* | (2017.01) | |
| *G06T 7/521* | (2017.01) | |
| *G06T 7/73* | (2017.01) | |
| *G06V 10/46* | (2022.01) | |
| *G06V 10/80* | (2022.01) | |
| *G06V 20/64* | (2022.01) | |

(52) U.S. Cl.
CPC ................ *G06T 7/40* (2013.01); *G01S 17/42* (2013.01); *G01S 17/894* (2020.01); *G06T 7/248* (2017.01); *G06T 7/521* (2017.01); *G06T 7/74* (2017.01); *G06V 10/462* (2022.01); *G06V 10/806* (2022.01); *G06V 20/64* (2022.01); *G06T 2207/10028* (2013.01)

(58) Field of Classification Search
CPC ........... G06T 7/40; G06T 7/248; G06T 7/521; G06T 7/74; G06T 2207/10028; G06T 2207/10004; G06T 2207/20016; G01S 17/42; G01S 17/894; G06V 10/462; G06V 10/806; G06V 20/64; G06F 18/253
USPC ........................................................ 382/103
See application file for complete search history.

(56) References Cited

U.S. PATENT DOCUMENTS

| | | | |
|---|---|---|---|
| 2003/0095711 A1* | 5/2003 | McGuinness ............. | G06T 7/33 382/209 |
| 2014/0254874 A1* | 9/2014 | Kurz ......................... | G06T 7/73 382/103 |
| 2020/0007736 A1* | 1/2020 | Sun ......................... | H04N 23/73 |

OTHER PUBLICATIONS

David G. Lowe, "Object Recognition from Local Scale-Invariant Features," ICCV, Corfu, Greece (Sep. 1999).
Herbert Bay et al., "SURF: Speeded Up Robust Features," ECCV, Graz, Austria (May 2006).

(Continued)

*Primary Examiner* — Stephen P Coleman
(74) *Attorney, Agent, or Firm* — PRICE HENEVELD LLP

(57) ABSTRACT

A feature point detection apparatus for detecting feature points in image data includes an image data providing unit for providing the image data, a key point determination unit for determining key points in the image data, a feature determination unit for determining features associated with the key points, each describing a local environment of a key point in the image data, and a feature point providing unit for providing the feature points. A feature point is represented by the position of a key point in the image data and the associated features. The image data comprise intensity data and associated depth data, and the determination of the key points and the associated features is based on a local analysis of the image data in dependence on both the intensity data and the depth data.

16 Claims, 5 Drawing Sheets

(56) References Cited

OTHER PUBLICATIONS

Chuan Luo et al., "Overview of Image Matching based on ORB Algorithm," ICSP, Trondheim, Norway (Jul.-Aug. 2019).
Wadim Kehl et al., "Deep Learning of Local RGB-D Patches for 3D Object Detection and 6D Pose Estimation," Springer International Publishing Ag (2016).
Max Schwarz et al., "RGB-D Object Recognition and Pose Estimation based on Pre-trained Convolutional Neural Network Features," 2015 IEEE International Conference on Robotics and Automation (ICRA), Seattle, WA (May 26-30, 2015).
Muhammad Zafar Iqbal et al., "Adaptive Fusion-Based 3D Keypoint Detection for RGB Point Clouds," Deutsches Patent Und Markenamt (ICIP 2019).
Malcolm Reynolds et al., "Capturing Time-of-Flight Data with Confidence," Advanced Technology Centre, BAE Systems, Bristol, UK (undated).
Yang Zhao et al., "Combing RGB and Depth Map Features for Human Activity Recognition," Microsoft Research, Washington, Deutsches Patent Und Markenamt (downloaded Nov. 5, 2020).

\* cited by examiner

FEATURE POINT DETECTION APPARATUS AND METHOD FOR DETECTING FEATURE POINTS IN IMAGE DATA

CROSS-REFERENCE TO FOREIGN PRIORITY APPLICATION

The present application claims the benefit under 35 U.S.C. §§ 119(b), 119(e), 120, and/or 365(c) of German Application No. 10 2020 103575.6 filed Feb. 12, 2020.

FIELD OF THE INVENTION

The invention relates to a feature point detection apparatus and a feature point detection method for detecting feature points in image data. The invention further relates to a feature point detection system comprising a depth camera for recording image data and the feature point detection apparatus for detecting feature points in image data, and a computer program comprising instructions which, when the program is executed by a computer, cause the computer to execute the feature point detection method for detecting feature points in image data.

BACKGROUND OF THE INVENTION

Methods for detecting feature points in images and tracking them across sequences of images have been in use since about the turn of the millennium. A well-known method of this type, which is based on the so-called Scale Invariant Feature Transform (SIFT), is described in David G. Lowe, "Object Recognition from Local Scale-Invariant Features," ICCV, Corfu, Greece, September 1999. Like most other methods, it involves three main processing stages. First, key points (in German "markante Punkte") of objects in one or more images are determined. Such key points are points that can be recognized with high likelihood in other images. These points are then described as unambiguously as possible using a vector of local features. By comparing the feature vectors, certain key points can be assigned to each other or found again in different images.

The described methods play a major role wherever scene points have to be retrieved in different images. Examples include image-based localization and the grasping of objects in robotics, navigation of autonomous vehicles in environments with obstacles, recognition of objects, reconstruction of three-dimensional (3D) scenes, and various 3D measurement tasks.

Almost all known methods work on the basis of single-channel intensity images, e.g., on gray-scale images or on the intensity component of color images (e.g., the V-value of the HSV color space). However, there is also a reasonable number of approaches dealing with an application to color images.

Modern time of flight, ToF, cameras provide, in addition to the intensity or color image, depth data, and, possibly, further data such as confidence data or the like. These data provide further information that can be used to improve the detection and/or the tracking of feature points.

It would therefore be desirable to provide a method for detecting feature points in images and tracking them across sequences of images that uses additional data, such as depth data and, possibly, confidence data, to improve the detection and/or the tracking of feature points.

SUMMARY OF THE INVENTION

It is an object of the invention to provide a feature point detection apparatus and a feature point detection method for detecting feature points in image data that use additional data, such as depth data, and, possibly, confidence data, to improve the detection, and/or the tracking of the feature points. It is a further object of the invention to provide a feature point detection system comprising a depth camera for capturing image data and the feature point detection apparatus for detecting feature points in image data, and a computer program comprising instructions which, when the program is executed by a computer, cause the computer to execute the feature point detection method for detecting feature points in image data.

According to a first aspect of the invention, a feature point detection apparatus for detecting feature points in image data is provided, wherein the feature point detection apparatus comprises: an image data providing unit for providing the image data; a key point determination unit for determining key points in the image data; a feature determination unit for determining features associated with the key points, each of which describes a local environment of a key point in the image data; and a feature point providing unit for providing the feature points, wherein a feature point is represented by the position of a key point in the image data and the associated features, wherein the image data comprises intensity data and associated depth data, and the determination of the key points and the associated features is based on a local analysis of the image data in dependence of both the intensity data and the depth data.

The invention is based on the inventor's realization that the depth data associated with the intensity data, like the intensity data, contain structural information about the key points and their local environments. Advantageously, this additional structural information can be used both to make the determination of the key points more robust and to make the description of the local environments of the key points less confusable.

It is preferred that the image data is recorded by a time of flight, ToF, camera. The intensity data of a ToF camera correspond in principle to those of a conventional two-dimensional (2D) camera. For example, the gray-scale image of a single-channel camera or the intensity component of the color image of a multi-channel camera, but the recorded image data are significantly more independent of the ambient conditions due to the in-camera light source. This alone favors a more robust detection of feature points in the image data compared to 2D cameras as well as their assignment to feature points detected in other image data (e.g., image data of an image sequence corresponding to a different acquisition time) (see below).

It is further preferred that the key point determination unit is adapted to determine the key points in mixed data, which are based on a mixture of the intensity data and the depth data. This has the advantage that the mixture allows the structural information in the intensity data and the depth data to be combined into a common value (in German "gemeinsame Größe"), in which the key points can be better determined.

It is preferred that the image data further comprise confidence data associated with the depth data, which indicate a reliability of the depth data, wherein in the mixture a local weighting of the depth data relative to the intensity data is dependent on the associated local confidence of the depth data. Since the confidence data indicate the reliability of the depth data, they can be used to evaluate the structural information contained in the intensity data and the depth data as optimally as possible. For example, it is useful to give more local weight to the depth data where they are reliable and less weight to them where they are less reliable.

It is further preferred that the key point determination unit is adapted to determine the key points at multiple resolution levels of the mixed data. In many cases where methods are used to detect feature points in image data, it is desirable that the feature points can be robustly tracked across sequences of image data with changing resolutions. In the invention, this can preferably be realized by determining the key points at multiple resolution levels of the mixed data and, possibly, determining the associated features for each of these resolution levels.

It is preferred that the features associated with the key points include first features and second features, wherein the first features each describes a local environment of the key point in the intensity data and the second features each describes a local environment of the key point in the depth data. As described above, both the intensity data and the depth data contain structural information about the key points. However, due to their different physical origins, the intensity data and the depth data are not directly comparable. Therefore, it is useful to determine separate features for both types of data, by which the description of the local environments of the key points can be made less confusing overall.

It is further preferred that the feature determination unit is adapted to determine the shape and/or the location of the local environment of a key point to be described by the features using the depth data. In the known methods for detecting feature points in 2D image data, the local environment of a key point to be described by the features is typically a rectangular or square neighborhood environment of the key point. Such a neighborhood environment may include areas belonging to the same object as the key point, but also areas of other objects in the background and/or foreground. In both cases, the encompassed areas have nothing to do with the object of the key point and should therefore be excluded from the determination of the features. Therefore, it is useful to use the structural information of the depth data to determine the shape and/or the location of the local environment of a key point to be described by the features in such a way that, if possible, it includes only areas belonging to the same object as the key point. In this context, it is further preferred that a feature point provided by the feature point providing unit is additionally represented by the shape and/or the location of the local environment.

It is preferred that the determining of the shape and/or the location of the local environment of the key point to be described by the features comprises a comparison of the depth value of the key point according to the depth data with the depth values of points of a neighborhood environment of the key point according to the depth data. If the difference between the depth value of the key point and the depth value of a point of the neighborhood environment exceeds a predetermined threshold, it may be assumed, for example, that the point of the neighborhood environment does not belong to the same object as the key point, so that it should be excluded from the determination of the features.

It is further preferred that the image data further comprise confidence data associated with the depth data, which indicate a reliability of the depth data, wherein the feature determination unit is adapted to determine a weighting of the first features relative to the second features, which is dependent on the associated local confidence of the depth data, wherein a feature point provided by the feature point providing unit is additionally represented by the weighting. As described above, the confidence data indicate a reliability of the depth data. Therefore, they can be used to evaluate the information contained in the first features and the second features as optimally as possible. For example, it is useful to weight the second features more heavily if the associated local depth data are reliable, and weight them less heavily if the associated local depth data are less reliable.

It is preferred that the feature point detection apparatus further comprises a pre-processing unit for pre-processing the image data, wherein the pre-processing unit is adapted to reconstruct unreliable local depth data from other local depth data. This may be necessary if, for example, image points of the sensor of the ToF camera are fully saturated. The reconstructed local depth data, like the reliable local depth data, can then be used in the processing for detecting feature points in the image data. Advantageously, which local depth data is unreliable can be determined based on the associated local confidence data. The reconstruction of the unreliable local depth data can be done. e.g. by interpolation from neighboring reliable local depth data.

Alternatively, it is preferred that the feature point detection apparatus is adapted to exclude unreliable local depth data from the processing for detecting the feature points in the image data.

It is preferred that the feature point detection apparatus further comprises an assignment unit for assigning feature points in the image data to feature points detected in other image data, wherein the assignment is based on a comparison of the features associated with the feature points in the image data and in the other image data, and, optionally, the shape and/or the location of the local environments.

According to another aspect of the invention, a feature point detection system for detecting feature points in image data is provided, the feature point detection system comprising: a depth camera for recording the image data; and the feature point detection apparatus according to the feature point detection system described above for detecting the feature points in the image data.

It is preferred that the depth camera is a time of flight, ToF, camera.

According to another aspect of the invention, a feature point detection method for detecting feature points in image data is provided, wherein the feature point detection method comprises: providing the image data, by an image data providing unit; determining key points in the image data, by a key point determination unit; determining features associated with the key points, each describing a local environment of a key point in the image data, by a feature determination unit; and providing the feature points, wherein a feature point is represented by the position of a key point in the image data and the associated features, by a feature point providing unit, wherein the image data comprises intensity data and associated depth data, and the determination of the key points and the associated features is based on a local analysis of the image data in dependence of both the intensity data and the depth data.

According to another aspect of the invention, a computer program is provided, the computer program comprising instructions which, when the program is executed by a computer, cause the computer to perform the feature point detection method described above.

It is understood that the feature point detection apparatus, the feature point detection system, the feature point detection method, and the computer program described above have similar and/or identical preferred embodiments, particularly as defined in the dependent claims.

It is understood that a preferred embodiment of the invention may also be any combination of the dependent claims with the corresponding independent claim.

BRIEF DESCRIPTION OF THE DRAWINGS

Preferred embodiments of the invention are described in more detail below with reference to the accompanying Figures, wherein.

DETAILED DESCRIPTION OF THE EMBODIMENTS

In the Figures, identical or corresponding elements or units are each given identical or corresponding reference signs. If an element or unit has already been described in connection with a Figure, a detailed description may be omitted in connection with another Figure.

Figure 1:
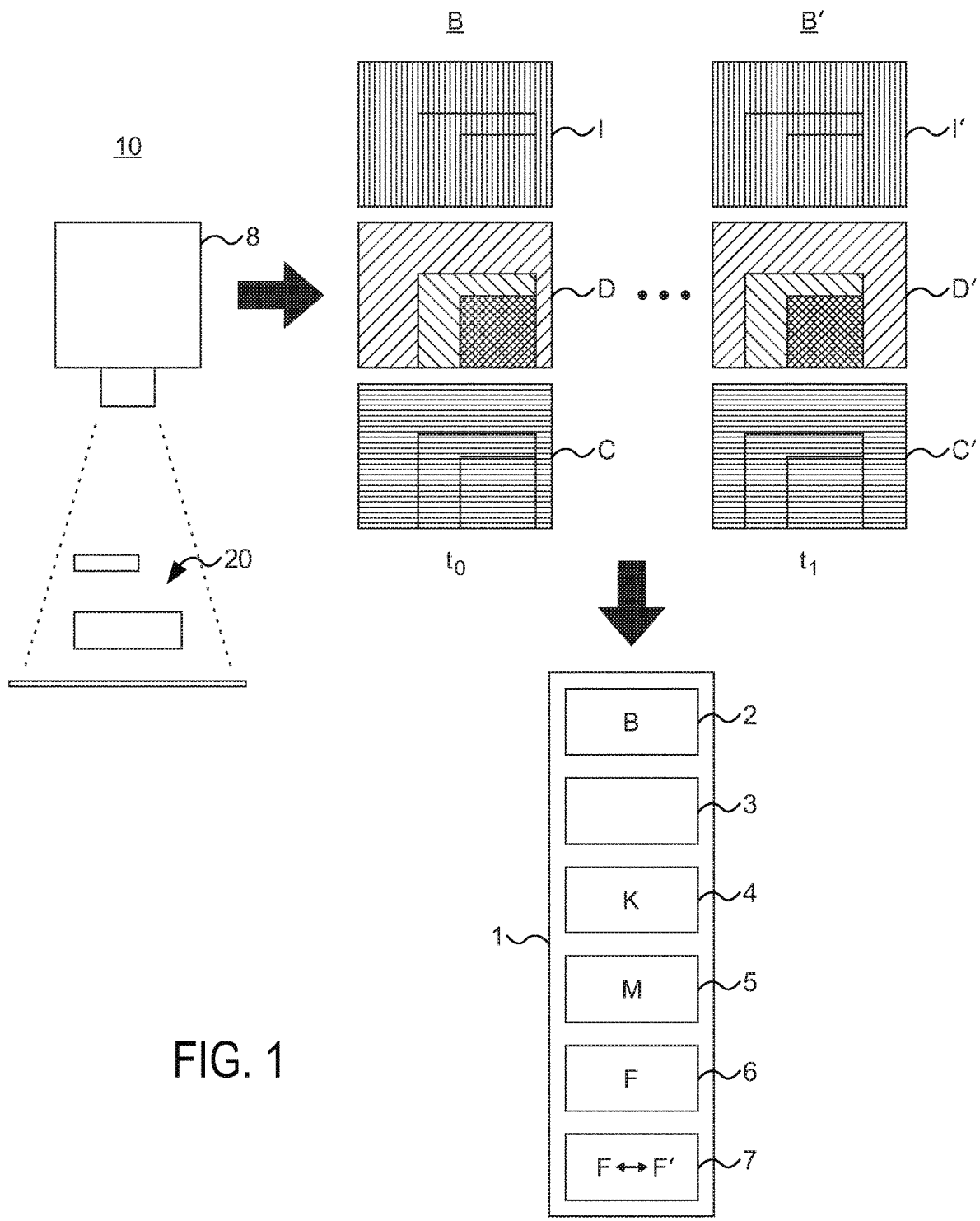
FIG. 1 schematically and exemplarily shows an embodiment of a feature point detection system for detecting feature points in image data.

An embodiment of a feature point detection system 10 for detecting feature points F in image data B is schematically and exemplarily shown in FIG. 1. The feature point detection system 10 comprises a depth camera 8, in this example, a time of flight, ToF, camera, for recording the image data B, wherein the image data B comprise intensity data I, associated depth data D, and, in this embodiment, associated confidence data C, and a feature point detection apparatus 1 for detecting the feature points F in the image data B.

The ToF camera 8 comprises an in-camera light source (not shown in the Figure), which emits a modulated light signal at a recording time $t_0$ in the direction of a spatial scene 20 to be recorded. This scene consists, in the example shown, of a scene background (e.g., a wall) and two objects arranged in front of it (here cuboid-shaped). The modulated light signal is reflected by the spatial scene 20 and detected by a sensor of the ToF camera 8 (also not shown in the Figure). From the travel time of the emitted and detected modulated light signal, the ToF camera 8 determines the depth data D, which are associated with the intensity data I and which are output together with the intensity data I and the associated confidence data C. The confidence data C indicate the reliability of the depth data D, as described above. In the Figure, the different hatchings in the depth data D represent different depths of the recorded spatial scene 20.

The intensity data I of the ToF camera 8 correspond in principle to those of an ordinary 2D camera, for example, the gray-scale image of a single-channel camera or the intensity component of the color image of a multi-channel camera, but the recorded image data B are significantly more independent of the ambient conditions due to the in-camera light source (not shown). This alone favors a more robust detection of feature points F in the image data B as well as their assignment to feature points F' detected in other image data B' compared to 2D cameras.

The feature point detection apparatus 1 comprises an image data providing unit 2 for providing the image data B, a pre-processing unit 3 for pre-processing the image data B, a key point determination unit 4 for determining key points K in the image data B, a feature determination unit 5 for determining features M associated with the key points K, a feature point providing unit 6 for providing the feature points F, wherein a feature point F is represented by the position of a key point K in the image data B and the associated features M, and an assignment unit 7 for assigning feature points F in the image data B to feature points F' detected in other image data B' (e.g., image data B' of an image sequence, which corresponds to another recording time $t_1$). According to the invention, the determination of the key points K and the associated features M is based on a local analysis of the image data B in dependence on both the intensity data I and the depth data D. Since the depth data D associated with the intensity data I, like the intensity data I, contain structural information about the key points K and their local environments, this additional structural information can advantageously be used both to make the determination of the key points K more robust and to make the description of the local environments of the key points K less confusable.

In this embodiment, the image data providing unit 2 is an interface that receives the image data B from the ToF camera 8 and provides them for further processing in the units 3 to 7 of the feature point detection apparatus 1. The characteristics of these units are explained in more detail below with reference to FIGS. 2 to 4.

Figure 2:
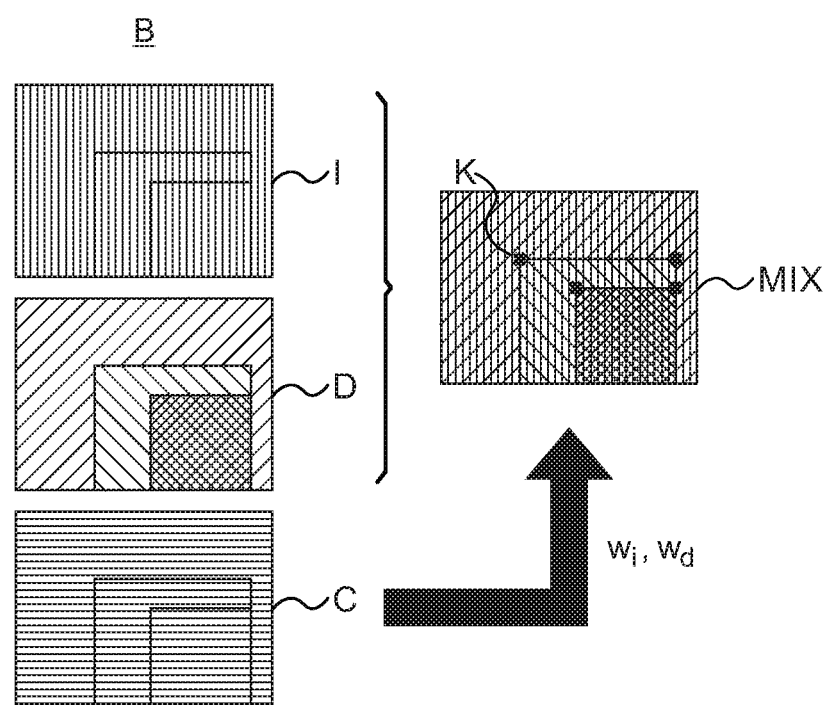
FIG. 2 schematically and exemplarily shows the characteristics of the key point determination unit for determining the key points in the embodiment of the feature point detection system.

FIG. 2 shows schematically and exemplarily the characteristics of the key point determination unit 4 for determining the key points K in the image data B in the embodiment of the feature point detection system 10. The key point determination unit 4 is adapted to determine the key points K (marked with an 'x' in the Figure) in mixed data MIX, which is based on a mixture of the intensity data I and the depth data D. The key points K are determined by the key point determination unit 4. This has the advantage that the mixture allows the structural information in the intensity data and the depth data to be combined into a common value, in which the key points can be better determined.

In this embodiment, in the mixture a local weighting of the depth data D relative to the intensity data I is dependent on the associated local confidence C of the depth data D. Since the confidence data C indicate the reliability of the depth data D, these can be used to evaluate the structural information contained in the intensity data I and the depth data D as optimally as possible. For example, it is useful to give more local weight to the depth data D where they are reliable and less weight to them where they are less reliable.

In an advantageous realization the mixed value mix of an image point in the mixed data MIX results from the intensity value i of the image point in the intensity data I and the corresponding depth value d of the image point in the depth data D as follows:

$$\text{mix} = w_i \cdot |i| + w_d \cdot |d| \tag{1}$$

where the weights $w_i$ and $w_d$ describe the local signal-to-noise ratio (SNR) of the intensity data I and the depth data D, respectively.

The SNR for the intensity data I is mainly determined by the photon noise, so that $w_i$ can advantageously be set to:

$$w_i \sim \sqrt{i} \tag{2}$$

In contrast, the SNR of the depth data follows directly from the confidence data C, advantageously to:

$$w_d \sim c \quad (3)$$

where c is the confidence value of the image point in the confidence data C.

In a variant of the embodiment, the key point determination unit 4 is adapted to determine the key points K at multiple resolution levels of the mixed data MIX. In many cases where methods for detecting feature points in image data are used, it is desirable that the feature points can be robustly tracked over sequences of image data with changing resolutions. In the invention, this can preferably be ensured by determining the key points K at multiple resolution levels of the mixed data MIX and, possibly, determining the associated features M for each of these resolution levels. For this purpose, for example, a so-called scale space of the intensity data I, the depth data D and the confidence data K is determined. The mixed data MIX are then determined at each scale level of the scale spaces according to equations (1) to (3).

In an advantageous realization based on a modification of the SIFT procedure (see David G. Lowe, 1999, ibid.), the scale space representation of the intensity data I and the depth data D is bipartite and comprises a Gaussian scale space and a difference-of-Gaussian scale space derived from it. The difference-of-Gaussian scale spaces of the intensity data I and the depth data D are linked at each scale level according to equations (1) to (3).

The determination of the key points K can then be performed analogously to the SIFT method. For this purpose, e.g., the maxima and minima are searched for at each resolution level of the mixed data MIX and their strength and preferred direction are determined. The latter can be done, for example, by determining the orientation of the key points K in a histogram of the local image gradient orientations. The strengths of the maxima and minima can be used in an optional additional filter step to restrict the key points K to maxima and minima that are as strong as possible—and thus as meaningful as possible. With the help of a suitable interpolation, the position can then be further improved if necessary. For example, the position of a key point K found at a low resolution level of the mixed data MIX can be further improved by interpolation using higher resolution levels of the mixed data MIX.

Figure 3:
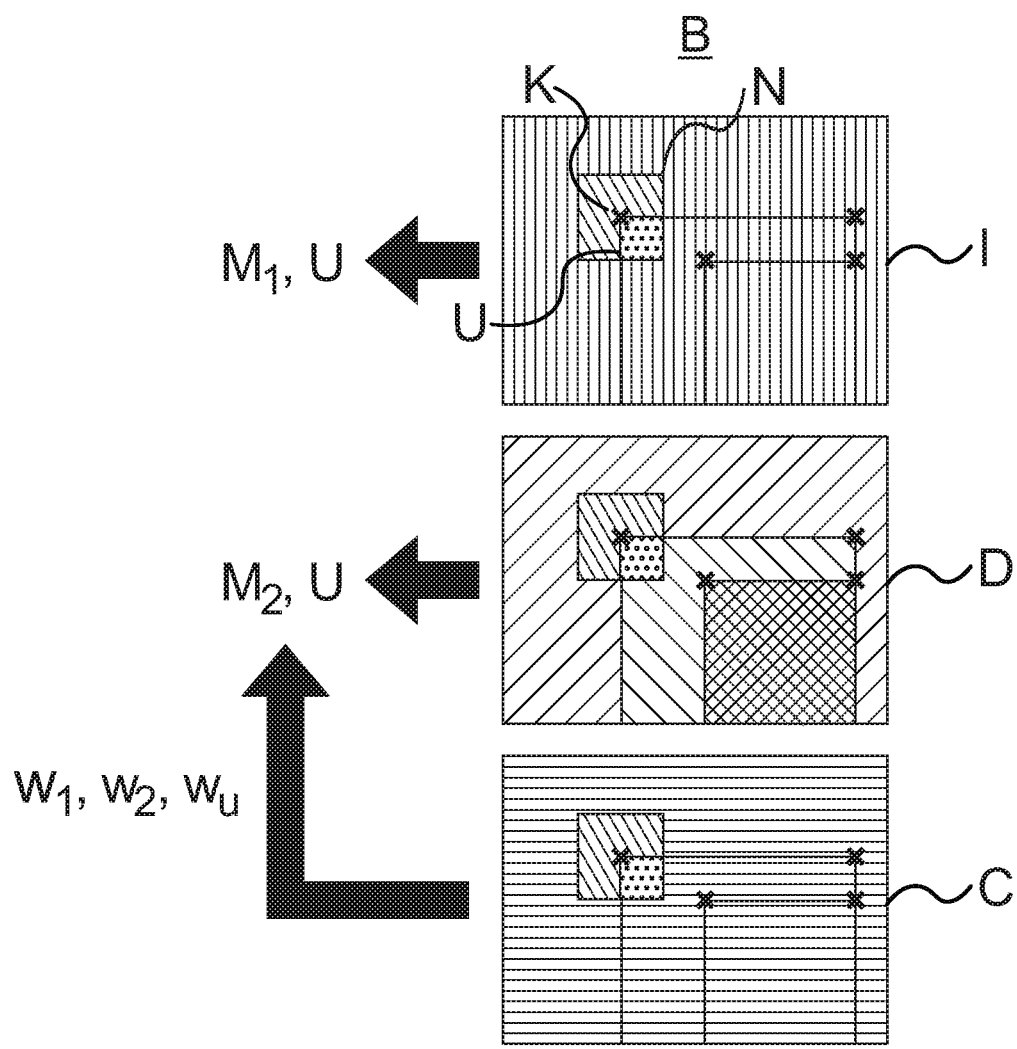
FIG. 3 schematically and exemplarily shows the features of the feature determination unit for determining the features associated with the key points in the embodiment of the feature point detection system.

FIG. 3 shows schematically and exemplarily the characteristics of the feature determination unit 5 for determining the features M associated with the key points K in the embodiment of the feature point detection system 10. In this embodiment, the features M associated with the key points K comprise first features $M_1$ and second features $M_2$, wherein the first features $M_1$ each describe a local environment U of the key point K in the intensity data I and the second features $M_2$ each describe a local environment U of the key point K in the depth data D. As described above, both the intensity data I and the depth data D contain structural information about the key points K. However, due to their different physical origins, the intensity data I and the depth data D are not directly comparable. Therefore, it is useful to determine separate features M1, M2 for both types of data, by which the description of the local environments U of the key points K can be made less confusing overall.

For example, local image gradients or the like can be used as the first and second features M1, M2. For example, in the SIFT method, the local environment U of a key point K is divided into 4×4 (i.e., 16 in total) subfields and the direction of the image gradient is determined for each of these subfields. The 16 gradient directions are then combined into a feature vector, which describes the local environment U of the key point. (Here, a weighting with a Gaussian function is usually still performed, so that subfields closer to the position of the key point K are weighted more heavily than subfields further away.) In the present invention, such an exemplary description of the local environment U of a key point K can be made both for the intensity data I (features $M_1$) and for the depth data D (features $M_2$).

In this embodiment, the feature determination unit 5 is adapted to determine the shape of the local environment U of a key point K to be described by the features M using the depth data D. In the known methods for detecting feature points in 2D image data, a rectangular or square neighborhood environment N of the key point K—possibly aligned according to the orientation of the key point K—is typically used as the local environment of a key point K to be described by the features M. Such a neighborhood environment N may include areas belonging to the same object as the key point K (in the Figure, the larger cuboid object), but also areas of other objects in the background (in FIG. 1, the wall) and/or foreground. In both cases, the encompassed areas have nothing to do with the object of the key point K and should, therefore, be excluded from the determination of the features M. Therefore, it is useful to use the structural information of the depth data D to determine the shape of the local environment U of a key point K to be described by the features M in such a way that, if possible, it includes only areas belonging to the same object as the key point K (in the Figure, the dotted area of the neighborhood environment N). A feature point F provided by the feature point providing unit 6 is additionally represented by the shape of the local environment U in this embodiment.

In an advantageous realization, the determination of the shape of the local environment U of the key point K to be described by the features M—possibly aligned according to the orientation of the key point K—comprises a comparison of the depth value $d_k$ of the key point K according to the depth data D with the depths $d_n$ of points n of a neighborhood environment N of the key point K according to the depth data D. If the magnitude of the difference between the depth value $d_k$ of the key point K and the depth value $d_n$ of a point n of the neighborhood environment N exceeds a predetermined threshold value T, it can be assumed, for example, that the point n of the neighborhood environment N does not belong to the same object as the key point K, so that it should be excluded from the determination of the features M. Mathematically, this can be expressed in such a way that a mask $M_n$ is determined as follows:

$$M_n = \begin{cases} |d_k - d_n| < T & : 1 \\ sonst & : 0 \end{cases} \quad (4)$$

The mask $M_n$ states whether a point n of the neighborhood environment N is relevant for the determination of the features M or not, and thus defines the shape of the local environment U. The threshold value T defines the discriminatory power. The shape of the local environment U describes another property of the key point K and thus additionally represents the feature point F. Thus, a feature point F can now be represented by the position of a key point K in the image data B, the associated features $M_1$ (intensity features) and $M_2$ (depth features), and the shape of the local environment U.

As described above, the image data B further comprise confidence data C associated with the depth data D, which indicate a reliability of the depth data D. In this embodiment, the feature determination unit 4 is adapted to determine a weighting of the first features $M_1$ relative to the second features $M_2$, which is dependent on the associated local confidence C of the depth data D, wherein a feature point F provided by the feature point providing unit 6 is additionally represented by the weighting. As described above, the confidence data C indicate a reliability of the depth data D. Therefore, they can be used to evaluate the information contained in the first features $M_1$ and the second features $M_2$ as optimally as possible. In this context, it is useful, for example, to give more weight to the second features $M_2$ if the associated local depth data D are reliable, and to give less weight to them if the associated local depth data D are less reliable.

In an advantageous realization, the weight $w_1$ of the first features $M_1$ and the weight $w_2$ of the second features result in analogy to equations (1) and (2) as follows:

$$w_1 = \Sigma \sqrt{i_n} \text{ für } n \in (M_n = 1) \tag{5}$$

$$w_2 = \Sigma c_n \text{ für } n \in (M_n = 1) \tag{6}$$

Also the local environment U can be assigned a weight $w_u$. Since the mask $M_n$ is largely insensitive to noise, the weight can be assumed to be a constant value of k:

$$w_u = k \tag{7}$$

The overall description of a feature point F is now composed of the features $M_1$ (intensity features) and $M_2$ (depth features) as well as the shape of the local environment U and the weights $w_1$, $w_2$ and $w_u$.

Referring again to FIG. 1, the pre-processing unit 3 is adapted to reconstruct unreliable local depth data D from other local depth data D. This may be necessary if, for example, image points of the sensor of the ToF camera 8 are completely saturated. The reconstructed local depth data D can then be used—as well as the reliable local depth data D—in the processing to detect the feature points F in the image data B. Advantageously, which local depth data D are unreliable can thereby be determined based on the associated local confidence data C. The reconstruction of the unreliable local depth data D is done here by interpolation from neighboring reliable local depth data D.

However, as an alternative to reconstructing unreliable local depth data D, in this embodiment of the feature point detection system 10, it is also possible to exclude unreliable local depth data D from the processing for detecting the feature points F in the image data B.

Figure 4:
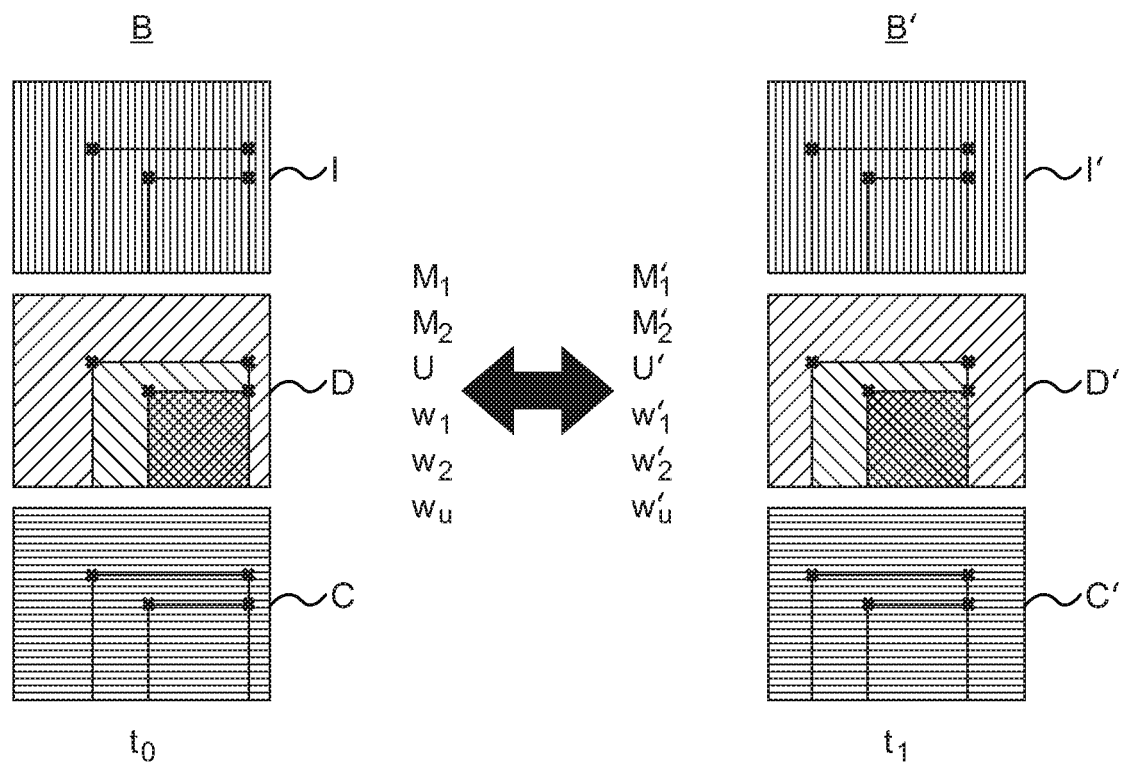
FIG. 4 schematically and exemplarily shows the characteristics of the assignment unit for assigning feature points in the image data to feature points detected in other image data in the embodiment of the feature point detection system.

FIG. 4 shows schematically and exemplarily the properties of the assignment unit 7 for assigning feature points F in the image data B to feature points F' detected in other image data B' (e.g., image data B' of an image sequence, which corresponds to another recording time $t_1$; cf. FIG. 1) in the embodiment of the feature point detection system 10. The assignment is based on a comparison of the features M or M' associated with the feature points F or F' in the image data B and in the other image data B' and, optionally, the shape of the local environments U or U'.

In an advantageous realization, a cost function E is determined which comprises, for example, a sum of the weighted Euclidean distances of the features $M_1$ and $M_1'$ (intensity features) and $M_2$ and $M_2'$ (depth features) and the local environments U and U':

$$E = \frac{w_1 + w_1'}{2}\|M_1 - M_1'\| + \frac{w_2 + w_2'}{2}\|M_2 - M_2'\| + \frac{w_u + w_u'}{2}\|U - U'\| \tag{8}$$

Figure 5:
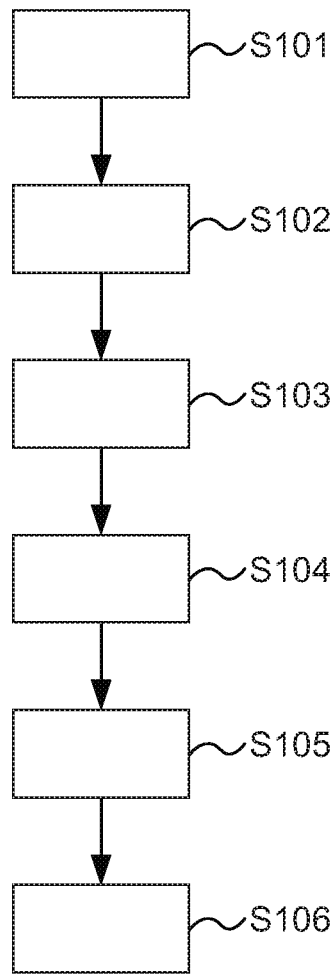
FIG. 5 shows a flowchart illustrating an embodiment of a feature point detection method for detecting feature points in image data.

In the following, an exemplary embodiment of a feature point detection method for detecting feature points F in image data B is described with reference to a flowchart shown in FIG. 5. In this embodiment, the feature point detection method is carried out by means of the feature point detection system 10 shown schematically and exemplarily in FIG. 1, in particular, by means of the feature point detection apparatus 1 comprised by it.

In step S101, the image data B is provided, wherein the image data B comprises intensity data I and associated depth data D. In this example, this is done by means of the image data providing unit 2.

In step S102, the image data B is pre-processed, wherein unreliable local depth data D is reconstructed from other local depth data D. In this example, this is done by means of the pre-processing unit 3.

In step S103, key points K in the image data B are determined. In this example, this is done by means of the key point determination unit 4.

In step S104, features M associated with the key points K are determined, each of which describes a local environment U of a key point K in the image data B. In this example, this is done by means of the feature determination unit 5.

In step S105, the feature points F are provided, wherein a feature point is represented by the position of a key point K in the image data B and the associated features M. In this example, this is done by means of the feature point providing unit 6.

In step S106, feature points F in the image data B are assigned to feature points F' detected in other image data B', wherein the assignment is based on a comparison of the features M, M' associated with the feature points F, F' in the image data B and in the other image data B'. In this example, this is done by means of the assignment unit 7.

In both steps S103 and S104, the determination of the key points K and the associated features M is based on a local analysis of image data B in dependence on both the intensity data I and the depth data D.

In the claims, the words "comprising" and "comprising" do not exclude other elements or steps, and the indefinite article "a" does not exclude a plurality.

A single unit or device may perform the functions of multiple elements listed in the claims. The fact that individual functions and/or elements are listed in different dependent claims does not mean that a combination of these functions and/or elements could not also be used advantageously.

Operations such as the providing of the image data, the determination of the key points in the image data, the determination of the features associated with the key points, et cetera, which are performed by one or more units or devices, may also be performed by another number of units or devices. These operations may be implemented as program code of a computer program and/or as corresponding hardware.

A computer program may be stored and/or distributed on a suitable medium, such as an optical storage medium or a solid-state storage medium distributed with or as part of other hardware. However, the computer program may also be distributed in other forms, such as via the Internet or other telecommunications systems.

While the image data providing unit 2 in the embodiment of the feature point detection system 10 shown in FIGS. 1 to 4 is an interface that receives the image data B from the ToF camera 8 and provides it for further processing in the units 3 to 7 of the feature point detection apparatus 1, the image data providing unit 2 in other embodiments may additionally or alternatively have a different configuration. For example, the image data providing unit 2 may be an interface that receives the image data B from a storage unit, for example, a non-volatile memory such as a hard disk, a read-only memory, or the like, or receives it from a server via a network, for example, a local area network or the Internet.

In the embodiment of the feature point detection system 10 shown in FIGS. 1 to 4, the image data B, which comprise the intensity data I, the depth data D, and the confidence data C, are acquired with the ToF camera 8. In other embodiments, another type of depth camera, such as a light detection and ranging (LIDAR) camera, may be used instead of the ToF camera 8. Furthermore, it is possible for some or all of the image data B to be generated by other means. For example, the intensity data I may be acquired with an ordinary 2D camera, for example, as a gray-scale image of a single-channel camera or as an intensity component of the color image of a multi-channel camera, and the depth data D may be generated with another depth detection method, such as a structured light method, a stereo matching method, or the like. Thus, the intensity data I and the depth data D do not necessarily have to come from a single camera or sensor, and the depth data D may be in different formats, e.g., as a depth image, as a 3D point cloud, in a grid representation, or the like. Depending on the embodiment of the feature point detection, it may then be necessary to convert the depth data D into another format, e.g., an image format, in a known manner. The same applies accordingly to the confidence data C. While in the embodiment of the feature point detection system 10 shown in FIGS. 1 to 4, these data are supplied directly by the ToF camera 8, in other embodiments they can also be estimated, for example, from the intensity data I and/or the depth data D, e.g., by a time series approach or with the aid of knowledge about the mode of operation and the measurement principle with which the intensity data I and/or the depth data D are determined.

In the embodiment of the feature point detection system 10 shown in FIGS. 1 to 4, the pre-processing unit 3 is adapted to reconstruct unreliable local depth data D from other local depth data D. However, it may additionally be adapted to perform other pre-processing steps. These include, for example, steps for eliminating image errors by means of a distortion correction, a correction of image point errors, a noise reduction, a linearity correction, a normalization of contrast and brightness, or the like. In other embodiments, the pre-processing unit 3 may also include generating the intensity data from color data, for example, by transforming data of the red, green, blue (RGB) color space into the hue, saturation, lightness (HSV) color space. In this case, the image data providing unit 2 and the pre-processing unit 3 may preferably be implemented in a common unit.

In the embodiment of the feature point detection system 10 shown in FIGS. 1 to 4, the feature determination unit 5 is adapted to determine the shape of the local environment U of a key point K to be described by the features M using the depth data D. In other embodiments, the feature determination unit 5 may additionally or alternatively be adapted to determine the location of the local environment U of a key point K to be described by the features M using the depth data D. For example, the shape of the local environment U can always be selected to be the same, but its location relative to the position of the key point K is selected to be located as much as possible on the object of the key point K. In the example shown in FIG. 3, this could be achieved, for example, by placing the neighborhood environment N as local environment U in such a way that it comes to rest with its upper left corner on the key point K.

In the embodiment of the feature point detection system 10 shown in FIGS. 1 to 4, the characteristics of the key point determination unit 4 and the feature determination unit 5 are described for an advantageous realization based on a modification of the SIFT method (see David G. Lowe, 1999, ibid.). Other advantageous realizations may also be based on variations of other well-known feature point detection methods, for example, the SURF method (see Herbert Bay et al., "SURF: Speeded Up Robust Features," ECCV, Graz, Austria, May 2006) or the ORB method (see Chuan Luo et al., "Overview of Image Matching based on ORB Algorithm," ICSP, Trondheim, Norway, July-August 2019), or they may be based on previously unknown feature point methods, in which depth data D and, possibly, confidence data C are used in addition to the intensity data I as described.

The reference signs in the claims are not to be understood in such a way that the subject matter and the scope of protection of the claims are limited by these reference signs.

In summary, a feature point detection apparatus for detecting feature points in image data has been described. The feature point detection apparatus comprises an image data providing unit for providing the image data; a key point determination unit for determining key points in the image data; a feature determination unit for determining features associated with the key points, each describing a local environment of a key point in the image data; and a feature point providing unit for providing the feature points, wherein a feature point is represented by the position of a key point in the image data and the associated features. The image data comprise intensity data and associated depth data, and the determination of the key points and the associated features is based on a local analysis of the image data in dependence on both the intensity data and the depth data.

The invention claimed is:

1. A feature point detection apparatus for detecting feature points in image data, comprising:
   an image data providing unit for providing the image data;
   a key point determination unit for determining key points in the image data;
   a feature determination unit for determining features associated with the key points, each of which describes a local environment of a key point in the image data; and
   a feature point providing unit for providing the feature points, wherein a feature point is represented by the position of a key point in the image data and the associated features,
   wherein the image data comprise intensity data and associated depth data, and the determination of the key points and the associated features is based on a local analysis of the image data in dependence on both the intensity data and the depth data;
   wherein the feature determination unit is adapted to determine the shape and/or the location of the local environment of a key point to be described by the features using the depth data; and
   wherein the determining of the shape and/or the location of the local environment of the key point to be described by the features comprises a comparison of the depth value of the key point according to the depth data with the depth values of points of a neighborhood environment of the key point according to the depth data.

2. The feature point detection apparatus according to claim 1, wherein the image data is recorded by a time of flight camera.

3. The feature point detection apparatus according to claim 1, wherein the key point determination unit is adapted to determine the key points in mixed data, which are based on a mixture of the intensity data and the depth data.

4. The feature point detection apparatus according to claim 3, wherein the image data further comprise confidence data associated with the depth data, which indicate a reliability of the depth data, wherein in the mixture a local weighting of the depth data relative to the intensity data is dependent on the associated local confidence of the depth data.

5. The feature point detection apparatus according to claim 3, wherein the key point determination unit is adapted to determine the key points at multiple resolution levels of the mixed data.

6. The feature point detection apparatus according to claim 1, wherein the features associated with the key points comprise first features and second features, wherein the first features each describe a local environment of the key point in the intensity data and the second features each describe a local environment of the key point in the depth data.

7. The feature point detection apparatus according to claim 1, wherein a feature point provided by the feature point providing unit is additionally represented by the shape and/or the location of the local environment.

8. The feature point detection apparatus according to claim 6, wherein the image data further comprise confidence data associated with the depth data, which indicate a reliability of the depth data, wherein the feature determination unit is adapted to determine a weighting of the first features relative to the second features, which is dependent on the associated local confidence of the depth data, wherein a feature point provided by the feature point providing unit is additionally represented by the weighting.

9. The feature point detection apparatus according to claim 1, further comprising:
a pre-processing unit for pre-processing the image data, wherein the pre-processing unit is adapted to reconstruct unreliable local depth data from other local depth data.

10. The feature point detection apparatus according to claim 1, wherein the feature point detection apparatus is adapted to exclude unreliable local depth data from the processing for detecting the feature points in the image data.

11. The feature point detection apparatus according to claim 1, further comprising:
an assignment unit for assigning feature points in the image data to feature points detected in other image data, wherein the assignment is based on a comparison of the features associated with the feature points in the image data and in the other image data.

12. The feature point detection apparatus according to claim 11, wherein the assignment is also based on the shape and/or the location of the local environments.

13. A feature point detection system for detecting feature points in image data, comprising:
a depth camera for recording the image data; and
the feature point detection apparatus for detecting the feature points in the image data, the feature point detection apparatus further comprising:
an image data providing unit for providing the image data;
a key point determination unit for determining key points in the image data;
a feature determination unit for determining features associated with the key points, each of which describes a local environment of a key point in the image data; and
a feature point providing unit for providing the feature points, wherein a feature point is represented by the position of a key point in the image data and the associated features,
wherein the image data comprise intensity data and associated depth data, and the determination of the key points and the associated features is based on a local analysis of the image data in dependence on both the intensity data and the depth data;
wherein the feature determination unit is adapted to determine the shape and/or the location of the local environment of a key point to be described by the features using the depth data; and
wherein the determining of the shape and/or the location of the local environment of the key point to be described by the features comprises a comparison of the depth value of the key point according to the depth data with the depth values of points of a neighborhood environment of the key point according to the depth data.

14. The feature point detection system according to claim 13, wherein the depth camera is a time of flight camera.

15. A feature point detection method for detecting feature points in image data, comprising:
providing the image data, by an image data providing unit;
determining key points in the image data, by a key point determination unit;
determining features associated with the key points, each of which describes a local environment of a key point in the image data, by a feature determination unit; and
providing the feature points, wherein a feature point is represented by the position of a key point in the image data and the associated features, by a feature point providing unit,
wherein the image data comprise intensity data and associated depth data, and the determination of the key points and the associated features, is based on a local analysis of the image data in dependence on both the intensity data and the depth data;
wherein the feature point detection method further comprises:
determining the shape and/or the location of the local environment of a key point to be described by the features using the depth data, by the feature determination unit,
wherein the determining of the shape and/or the location of the local environment of the key point to be described by the features comprises a comparison of the depth value of the key point according to the depth data with the depth values of points of a neighborhood environment of the key point according to the depth data.

16. A feature point detection apparatus for detecting feature points in image data, comprising:
an image data providing unit for providing the image data;
a key point determination unit for determining key points in the image data;

a feature determination unit for determining features associated with the key points, each of which describes a local environment of a key point in the image data; and a feature point providing unit for providing the feature points, wherein a feature point is represented by the position of a key point in the image data and the associated features;

wherein the image data comprise intensity data and associated depth data, and the determination of the key points and the associated features is based on a local analysis of the image data in dependence on both the intensity data and the depth data;

wherein the key point determination unit is adapted to determine the key points in mixed data, which are based on a mixture of the intensity data and the depth data; and wherein the image data further comprise confidence data associated with the depth data, which indicate a reliability of the depth data, wherein in the mixture a local weighting of the depth data relative to the intensity data is dependent on the associated local confidence of the depth data.

* * * * *